UNITED STATES PATENT OFFICE.

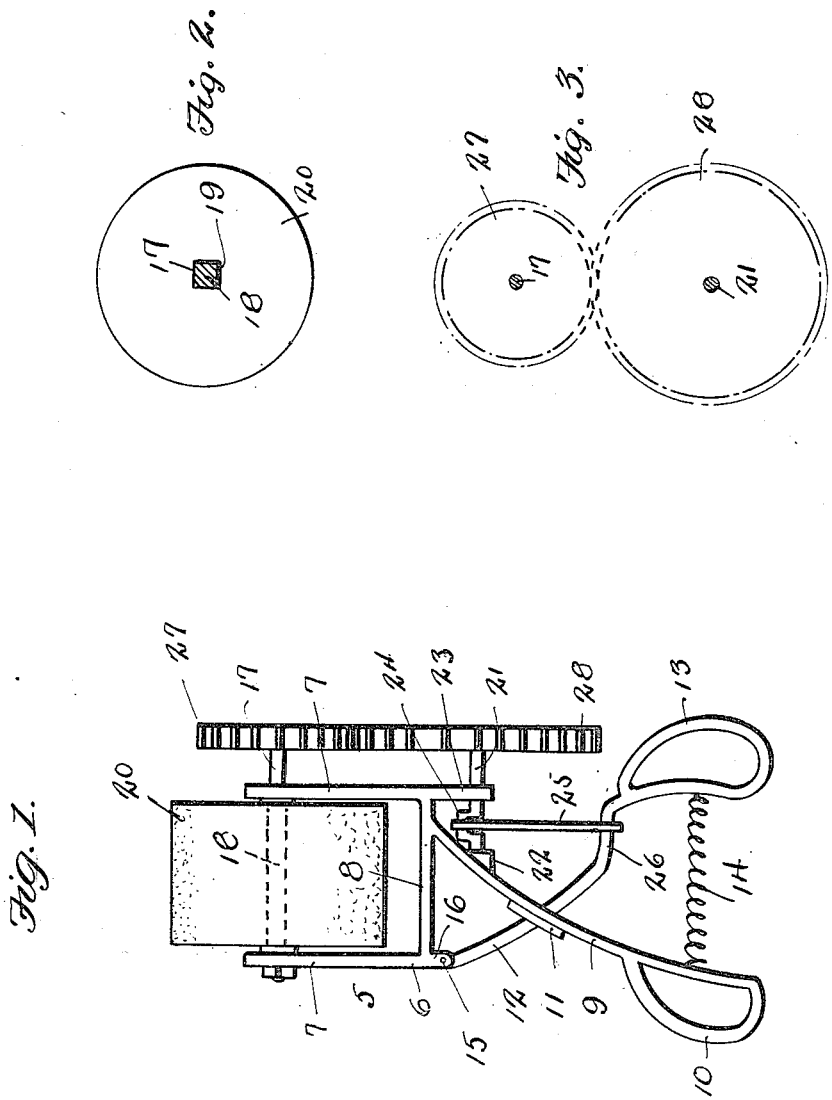

ROMAN ZAWERACZ, OF BENTLEYVILLE, PENNSYLVANIA.

KNIFE-SHARPENER.

1,143,096.   Specification of Letters Patent.   Patented June 15, 1915.

Application filed January 27, 1915. Serial No. 4,783.

*To all whom it may concern:*

Be it known that I, ROMAN ZAWERACZ, a subject of Austria-Hungary, residing at Bentleyville, in the county of Washington, State of Pennsylvania, have invented certain new and useful Improvements in Knife-Sharpeners, of which the following is a specification.

The present invention relates to new and useful improvements in knife sharpeners.

An object of the invention is the provision of a knife sharpener, which consists of a rotary sharpening disk or wheel and two movable members so connected thereto, that upon their relative movement, the said disk or wheel can be rotated.

Another object of the invention is the provision of a rotary sharpening device, which can be conveniently carried about and easily operated to sharpen knives, and in fact any other like small articles or larger ones.

A further object of the invention is to improve and simplify devices of this character, rendering them comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the drawing, it being understood that various minor changes in the specific details of construction can be resorted to within the scope of the appended claim without departing from the spirit of sacrificing any of the advantages of the invention.

In the accompanying drawing, forming a part of this application, Figure 1 is a side elevation of my invention, Fig. 2 is a detail view of the disk or wheel, Fig. 3 is a view illustrating the form of gearing employed.

Referring to the accompanying drawing by similar characters of reference throughout the several views, the numeral 5 designates in general my improved sharpening device, consisting of substantially U-shaped frame 6, having opposite sides 7 and arch portion 8.

A curved handle 9 extends from the arch 8, downwardly and terminates in a finger loop 10. This handle 9 has a guide 11 formed thereon, through which extends a movable handle 12, which has a finger loop 13 formed at its lower end, corresponding to the before mentioned finger grip or loop 10.

A tension spring connects the lower ends of the handles 9 and 12, as shown at 14 and serves normally to force them to the positions shown in Fig. 1. The upper end of the handle 12 is pivoted as at 15 to the depending ear 16, which projects from one end of the arch 8, in parallel alinement with the adjacent side 7 of the frame 6.

A shaft 17 is journaled in the upper ends of the side members 7, and is preferably squared intermediate its ends as at 18, to fit within the squared concentric opening 19 of an abrasive disk or wheel 20, formed from any suitable material.

A shaft 21 is journaled in bearings 22 and 23, formed respectively upon the adjacent portions of the handle 9 and arch 8 of the frame 6. This shaft 21 is formed with a crank portion 24, which is connected with the upper end of a link 25, the lower end of which is connected with the bight portion 26 of the movable or pivoted handle 12, and manifestly upon the relative movement of the handles 9 and 12, by the fingers of the operator, the shaft 21 can be rotated, which imparts a rotary movement to the shaft 17 and disk 20, through the medium of the intermeshing gears 27 and 28, keyed respectively to the shafts 17 and 21.

From the foregoing disclosures, the description and operation of the device will be manifest, and it will be apparent that a sharpening implement is provided, which will fulfil all of the necessary requirements of such a device.

Having thus fully described this invention, what I claim as new and desire to protect by Letters Patent is:

A knife sharpener comprising a frame of U-shaped formation, including opposite side members arranged in parallel relation, and an arch connecting the said side members in spaced relation to the lower ends, forming extensions below the arch of unequal length, a shaft journaled in the upper ends of said side members, a sharpening disk keyed to said shaft between the side members, a pinion keyed to the shaft beyond the adjacent side member, a rigid handle formed integrally upon the arch and in the same plane as the U-shaped frame and curving from a point adjacent the longer of the extensions to a point beyond the other of the said extensions, a guide secured to the rigid handle, a movable handle pivoted to the shorter of the extensions and disposed within the guide, said movable handle having a straightened portion disposed substantially parallel to the arch, alining bearings provided at the terminal of the longer of said extensions and upon the stationary handle, a crank shaft journaled in said bearings and having its crank disposed between the adjacent sides of the longer extension and stationary handle, a link connecting the crank and the straight portion of the movable handle, and a pinion keyed to the crank shaft and meshing with the first mentioned pinion.

In testimony whereof I affixed my signature in presence of two witnesses.

ROMAN ZAWERACZ.

Witnesses:
W. E. MINOR,
J. H. WISE.

Copies of this patent may be obtained for five cents each, by addressing the "Commissioner of Patents, Washington, D. C."